July 12, 1932.

E. H. MORROW

ATTACHMENT FOR OIL CANS

Re. 18,526

Original Filed Nov. 19, 1927

Inventor,
Emmet H. Morrow,
By Clarence J. Loftus,
Atty.

Reissued July 12, 1932 Re. 18,526

UNITED STATES PATENT OFFICE

EMMET H. MORROW, OF CHICAGO, ILLINOIS, ASSIGNOR, BY MESNE ASSIGNMENTS, TO CHARLES O. MOORE, OF CHICAGO, ILLINOIS

ATTACHMENT FOR OIL CANS

Original No. 1,767,223, dated June 24, 1930, Serial No. 234,334, filed November 19, 1927. Application for reissue filed May 31, 1932. Serial No. 614,648.

This invention relates to attachments for oil cans, and more particularly to the provision of an oil seal for preventing a back flow of lubricant from the oil hole in which the spout of the oil can is inserted.

Among the objects of my invention are to provide an oil seal or attachment for oil cans of novel construction and adapted to be detachably held on the oil spout; further to provide a new and improved construction of oil seal, formed or constructed of rubber or rubber-like material or composition, the face of which will readily adjust itself to the oil hole and make a tight connection therewith so as to prevent the leakage of any oil that is being forced into such hole; further to provide a new and improved construction of oil seal or attachment for oil cans of novel shape or configuration; further to provide an oil seal or attachment that is interchangeable so that either end thereof is adapted for engagement with the oil hole; further to provide an oil seal or attachment adapted to be used as a stopper or seal for the end of the oil spout when the oil can is not in use; further to provide an oil seal or attachment of maximum simplicity, efficiency, economy, and ease of operation; and such further objects, advantages and capabilities as will later more fully appear.

My invention further resides in the combination, construction and arrangement of parts illustrated in the accompanying drawing, and while I have shown therein a preferred embodiment, I desire it to be understood that the same is susceptible of modification and change without departing from the spirit of my invention.

One form of the invention is shown in the accompanying drawing and the views thereof are as follows:

Figure 1:
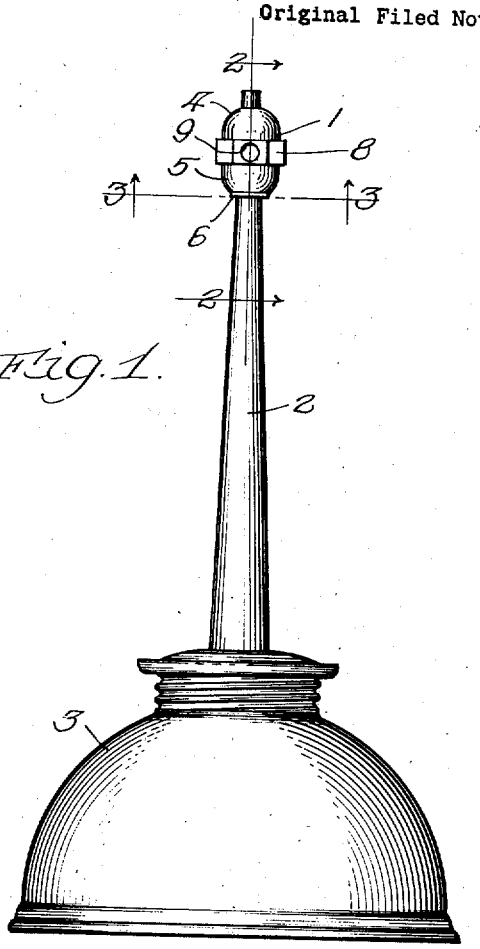
Fig. 1 is a view in side elevation of an oil can with an attachment thereon embodying my invention.
Figure 2:
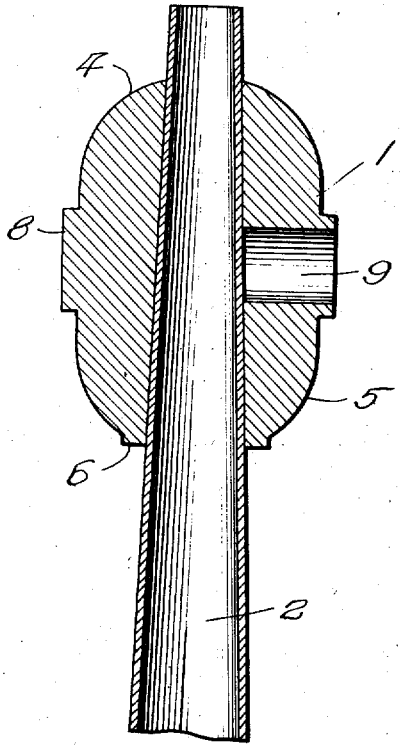
Fig. 2 is a fragmentary vertical cross sectional view on line 2—2 of Fig. 1.

Referring to the form of invention illustrated in the drawing, the attachment or oil seal or fitting is designated generally at 1, and in Fig. 1 is shown as applied to the end of an oil spout 2 of an oil can 3. My attachment or oil seal comprises an elongated body of rubber composition, or other suitable material having a reasonable amount of elasticity so that with a small amount of pressure, such body may readily adjust itself to the inner circumference of an oil hole so as to prevent any leakage therefrom. The upper and lower portions of the member 1 are provided with curved faces 4 and 5 respectively, the lower portion 5 being further provided with a bead 6 as more clearly shown in Fig. 3. A circular opening 7 passes longitudinally through the center of such attachment or oil seal for allowing the same to be readily inserted over the upper end of the spout 2. The purpose of the bead 6 is to strengthen the lower portion of the attachment so as to prevent the same from splitting while it is being placed over the oil spout.

Any other means might be employed for preventing splitting of the attachment, if desired. A sleeve, for instance, might be arranged about the ends of the same.

Figure 3:
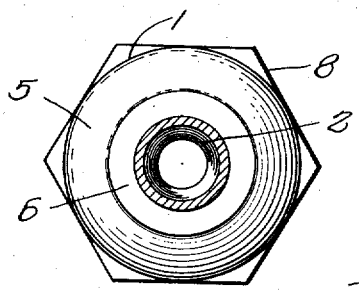
Fig. 3 is a horizontal cross-sectional view on the line 3—3 of Fig. 1.

The central portion 8 of the member 1 is in the form of a polygon, or, as more clearly shown in Fig. 3 of the drawing, is in the form of a hexagon, although any number of sides may be provided. The purpose of this portion 8 is for facilitating the attaching or removal of the oil seal, it being understood that the opening in the member 1 makes a sufficiently tight connection with the upper end of the oil spout so that the member 1 cannot be readily attached or removed except by turning such member.

Figure 4:
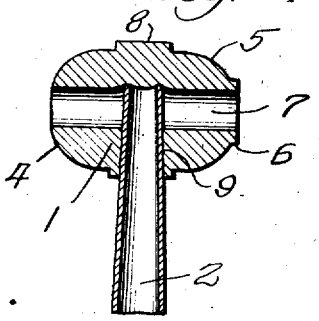
Fig. 4 is a fragmentary cross-sectional view of my attachment or oil seal as applied to the end of the spout of an oil can for preventing leakage when such oil can is not in use.

An opening 9 may be provided in one of the sides of the polygon. This opening is adapted to fit over the upper end of the oil spout, as more clearly disclosed in Fig. 4. When the member 1 is inserted or placed in this position shown in Fig. 4, it provides a seal or stopper for preventing the leakage of any oil from the can when the same is not in use.

In operation, the attachment or oil seal is forced over the end of the oil spout to a position substantially as shown in Fig. 1, the upper end thereof being spaced from the upper end of the oil spout. As stated above, the attaching of the oil seal to the position shown in Fig. 1 is accomplished by a turning movement of the member. This turning movement is greatly facilitated by the provision of the polygonal portion 8 of the attachment. When it is desired to force a lubricant into an oil hole, the end of the oil spout is inserted into such hole to a depth where the rounded portion 4 contacts with the inner circumference of the oil hole, and due to the resiliency of the material of which the attachment is formed, the rounded face 4 will adjust itself to the inner circumference of the oil hole and form a tight seal therewith, preventing the leakage of any oil that is being forced into such hole. As stated above, either the rounded portion or face 4 or 5 can be used as the upper face for providing a contacting engagement with the oil hole, although when the face 5 is used for such purpose, the oil hole should have a diameter greater than the diameter of the bead 6 of such face.

The portion of the spout of the lubricator extending beyond the end 4 of the member 1 serves as a pilot in applying the lubricator or oil can to an oil orifice or hole for lubricating purposes.

The fitting or oil seal is so applied to the spout as to lie inwardly of, or behind the discharge orifice of the spout. That portion of the spout structure ahead, or in front, of the fitting constitutes a pilot for use in applying the oil can or lubricator to an oil hole or orifice.

When the oil can or lubricator is applied to an oil hole or orifice, it is pressed against the material defining such hole or orifice in substantially end-to-end contact, and the resiliency of the seal permits it to be thus endwise compressed to seal the hole or orifice against spillage of lubricant between the oil hole and lubricator spout.

It will thus be seen that I have provided an attachment or oil seal for oil cans that will make a tight connection with the oil hole when the lubricant is being forced into such hole. The rounded contours of the faces will adjust themselves to the hole and prevent the leakage of any lubricant therefrom.

Having thus disclosed my invention, I claim:

1. An attachment for oil can spouts, comprising a resilient member having an opening therethrough for detachable application to the spouts for engaging an oil aperture, the opposite ends of said member being provided with rounded faces.

2. An attachment for oil can spouts comprising a resilient member having an opening therethrough for detachable application to the spouts for engaging an oil aperture, the opposite ends of said member being provided with rounded faces, one of said faces being further provided with a bead.

3. An attachment for oil cans comprising a resilient member having an opening therethrough adapted for detachable engagement with the spout of said can, the intermediate portion of said member being polygonal in cross-section for providing a gripping surface for the ready attaching or removal of said member.

4. An attachment for oil cans comprising a resilient member having an opening therethrough adapted for removable engagement with the spout of said can for contacting engagement with an oil receptacle, and means in a side wall of said member for connection with the end of said spout and providing a stopper for said end.

5. An attachment for oil can spouts comprising a member of resilient material having an opening from end to end thereof and arranged for detachable engagement with the end of the spout for contacting an oil hole, said member having one of its ends rounded to seal the oil hole.

6. An attachment for a lubricator discharge spout comprising a member of resilient material having an opening from end to end thereof and arranged for detachable engagement with a spout for contacting an oil orifice, said member being endwise compressible when applied to the oil orifice for sealing the orifice during lubrication.

7. An attachment for a lubricator discharge spout comprising a member of resilient material having an opening from end to end thereof and arranged for detachable engagement with a spout for contacting an oil orifice, the end of said member adjacent the spout tip having endwise engagement with an oil orifice when the spout is applied thereto, the end of the member against the oil orifice being resilient and compressible to seal the orifice during lubrication.

8. An attachment for a lubricator discharge spout comprising a member of resilient material having an opening from end to end thereof, and arranged for detachable engagement with a spout for contacting an oil orifice, the portion of the member engaging with the oil orifice being resilient and endwise compressible to seal the orifice during lubrication.

9. An orifice sealing member for removable attachment to a lubricator spout, said member having an oil orifice engaging end which is resilient and compressible against the oil orifice when said lubricator spout is applied to said orifice for sealing said orifice against escape of lubricants during lubrication.

10. An attachment for oil cans, comprising a resilient member adapted for engagement with the spout of the can, the end of said member adjacent the spout tip being adapted for contacting engagement with an oil hole and being endwise compressible when applied to the oil hole for sealing the hole.

11. An attachment for oil cans, comprising a resilient member adapted for engagement with the spout of the can, the end of said member adjacent the spout tip being adapted for contacting engagement with an oil hole and being endwise compressible when applied to the oil hole for sealing the hole, and said member being applied to the spout in such manner that the member end adjacent the spout tip is spaced inwardly from said spout tip, the spout tip beyond said member serving as a pilot for applying said spout to an oil hole.

12. A lubricator having a discharge spout structure, a reversible fitting or oil seal of yieldable material having an opening therein from end to end thereof and removably attachable to the spout structure, the fitting being applied to the spout structure with the end of the fitting adjacent the discharge orifice of the spout structure behind said discharge orifice and the portion of the spout structure ahead of said fitting constituting a pilot.

In testimony whereof I have hereunto subscribed my name at Chicago, Cook County, Illinois.

EMMET H. MORROW.